United States Patent [19]
Johnson et al.

[11] Patent Number: 6,097,772
[45] Date of Patent: Aug. 1, 2000

[54] SYSTEM AND METHOD FOR DETECTING SPEECH TRANSMISSIONS IN THE PRESENCE OF CONTROL SIGNALING

[75] Inventors: Phillip Marc Johnson, Raleigh; David Gregory, Apex, both of N.C.; Yongbing Wan, Irvine, Calif.

[73] Assignee: Ericsson Inc., Research Triangle Park, N.C.

[21] Appl. No.: 08/976,697

[22] Filed: Nov. 24, 1997

[51] Int. Cl.[7] .................................. H04L 1/00; H04B 1/10
[52] U.S. Cl. .......................... 375/346; 375/262; 375/341; 370/345; 455/403; 704/242
[58] Field of Search ..................... 375/220, 256, 375/262, 265, 340, 341, 346; 370/345, 522, 332, 321, 347; 380/49; 455/623, 410, 437, 442, 507, 522, 403; 704/212, 220, 242

[56] References Cited

U.S. PATENT DOCUMENTS

| | | | |
|---|---|---|---|
| 5,060,266 | 10/1991 | Dent | 380/49 |
| 5,212,823 | 5/1993 | Fujii et al. | 455/522 |
| 5,323,446 | 6/1994 | Kojima et al. | 455/437 |
| 5,499,246 | 3/1996 | Cooper | 370/95.1 |

FOREIGN PATENT DOCUMENTS

| | | |
|---|---|---|
| 0 651 523 A2 | 10/1994 | European Pat. Off. . |
| 0 651 523 A3 | 10/1994 | European Pat. Off. . |

*Primary Examiner*—Stephen Chin
*Assistant Examiner*—Chieh M. Fan
*Attorney, Agent, or Firm*—Jenkens & Gilchrist

[57] ABSTRACT

A telecommunications system and method for improving the detection of speech and control signals within a telecommunications transmission, particularly, reducing the probability that the control signals and other non-speech transmission segments are interpreted as speech and played. Also, the system and method of the present invention is directed to techniques for reducing the probability that random noise during discontinuous transmission periods are interpreted as speech and played.

40 Claims, 6 Drawing Sheets

SYSTEM AND METHOD FOR DETECTING SPEECH TRANSMISSIONS IN THE PRESENCE OF CONTROL SIGNALING

BACKGROUND OF THE INVENTION

1. Field of the Invention

The present invention relates to a communications system and method, particularly, to a communicaitons protocol for the detection of speech transmissions amid control signals, and, more particularly, to an improved system and method for distinguishing valid speech frame transmissions from control signals and random radio/frequency (RF) noise, thereby avoiding speech quality degradation by minimizing the chance of incorrectly processing a non-speech frame as if it were speech.

2. Background and Objects of the Invention

The evolution of wireless communication over the past century, since Guglielmo Marconi's 1897 demonstration of radio's ability to provide continuous contact with ships sailing the English Channel, has been remarkable. Since Marconi's discovery, new wireline and wireless communication methods, services and standards have been adopted by people throughout the world. This evolution has been accelerating, particularly over the last ten years, during which time the mobile radio communications industry has grown by orders of magnitude, fueled by numerous technological advances that have made portable radio equipment smaller, cheaper and more reliable. The exponential growth of mobile telephony will continue in the coming decades, as this wireless network interacts with and eventually overtakes the existing wireline networks.

The Global System for Mobile (GSM) communications is a second generation cellular system standard developed to solve various fragmentation problems of the first cellular systems in Europe. GSM is the world's first cellular system to specify digital modulation and network level architectures and services. Currently, GSM is the most popular standard for new radio and personal communications equipment throughout the world.

The Satellite Air Interface Specification (SAIS) is essentially an adaption of the GSM specification and is designed to provide telephone coverage by use of a geostationary satellite, such as the Asia Cellular Satellite (ACeS) to be deployed over SouthEast Asia. The ACeS system is designed to provide coverage to areas having limited land-line and cellular infrastructures, allowing the use of hand-held pocket phones throughout much of SouthEast Asia. Although the SAIS attempts to adhere to the GSM standard, there are differences between the two systems, such as the introduction of a high-margin channel to reach disadvantaged or remote users and a lower speech coder rate. In contrast to the GSM full-rate speech of 13 Kbps, the SAIS vocoder codes speech at a rate of 3.6 Kbps. This leads to the SAIS ability to support 32 users per 200 KHz effective channel versus GSM's 8 users for the same bandwidth.

In GSM, all associated and common control channel signaling formats are defined on the basis of fixed length messages that undergo extensive error control coding prior to transmission over the airlink. For example, a fixed length message is block encoded using a conventional fire code and then convolutionally encoded. The resultant encoded message is then interleaved and sent over the airlink.

Through one of the Associated Control Channels, the Fast Associated Control Channel (FACCH), control signals are sent in-band with speech frame transmissions. FACCH provides quick communication between a base station and a cellular phone for purposes such as hand-overs between cells. However, FACCH messages steal or blank out speech frames while the necessary handover or other signaling information is transmitted. Accordingly, a receiving device must distinguish incoming signals as either speech frames or control data. As is understood in the art, FACCH and other control signals generally cause a speech decoder to repeat a previous speech segment or mute. Where a FACCH signal is mistakenly interpreted as a valid speech frame and passed through the speech decoder, the FACCH signal may introduce loud pops or other artifacts into the audio path. Thus, without adequate safeguards to prevent such a misinterpretation, the receiving user will perceive degraded speech quality due to the corrupted audio path.

In addition, a common feature in satellite and terrestrial digital cellular standards is Discontinuous Transmission (DTX). This feature allows a transmitter to save power and reduce RF interference by transmitting at a reduced duty cycle during periods when there is no voice activity. During a DTX period, voice may restart at any time prompting the transmitter to resume normal transmission. Accordingly, the receiving radio must always be ready to receive speech. This implies that the receiver remains on during DTX periods searching for a valid speech frame. There is a chance that the random noise on the air will occasionally pass through the receiver and be interpreted as a valid speech frame which gets played. Without some corrective action (as described in this disclosure), the mathematical probability of a noise frame passing into the audio path during a DTX period is quite significant. If a frame of random noise does mistakenly get passed to the speech decoder and played, it will likely create a pop or other audio artifact within the DTX period, thereby degrading the perceived audio quality.

In an effort to prevent the aforementioned sources of audio degradation, current digital standards have some reasonably straightforward and robust methods for distinguishing speech and FACCH signals. Also, DTX periods are currently distinguished by using the quality of a Viterbi metric or the strength of sync correlation, as is understood in the art. The problem is that the SAIS is presently inadequate to prevent these sources of audio degradation.

Accordingly, it is an object of the present invention to prevent the interpretation of FACCH or other overriding control messages as speech, thereby avoiding artifacts that degrade speech quality.

It is another object of the present invention to avoid the conversion of random noise into speech frames during DTX periods.

SUMMARY OF THE INVENTION

The present invention is directed to a communications system and method for improving the detection of speech frames within a telecommunications transmission, particularly, reducing the probability that control signals get interpreted as speech frames and played as audio. Also, the system and method of the present invention is directed to techniques for reducing the probability that random RF noise gets interpreted as speech frames and played as audio.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE PREFERRED EMBODIMENT

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Before describing the communications system and method for improved detection of valid speech frames amid control signals and random noise, such as in an ACeS system, it is useful to first describe the communication environment of the GSM system upon which ACeS is based, as well as other environments where control signals are interspersed with speech data.

Figure 1:
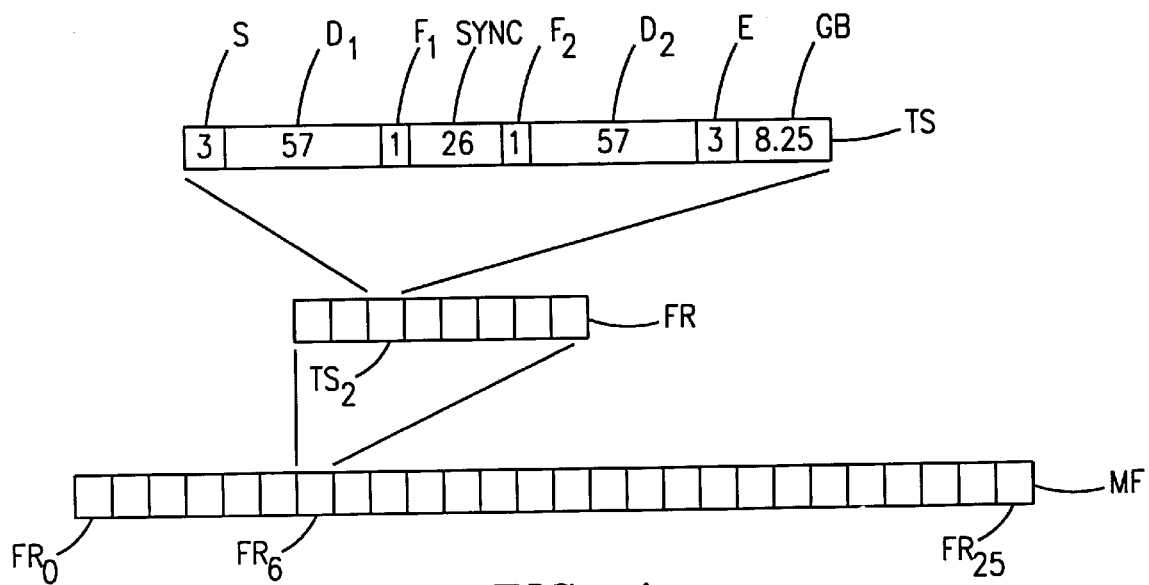
FIG. 1 is a block diagram illustrating the format of a frame timeslot in normal burst mode in GSM.

Under GSM, speech data and control signal data from the Fast Associated Control Channel (FACCH) are transmitted over a multiplicity of bursts. The format of a normal transmission burst is shown in FIG. 1. With speech processing at the rate of 13 Kbps, 260 bits of speech are generated every 20 ms. With block and convolutional coding, those 260 bits are expanded to 456 bits for each 20 ms frames of speech. The 456 bits are divided into four 114 bit blocks, each of which are mapped to the data fields $D_1$ and $D_2$ shown in FIG. 1.

The 42.25 additional bits in the burst include: a 26-bit training sequence for the equalizer, i.e., (SYNC) bits, allowing burst demodulation with no information from previous bursts; time slot start (S) and end (E) tail flags of 3 bits each, allowing the impulse response of the channel and modulation filter to terminate within the burst, ensuring that end bit demodulation is the same as at the burst middle; two one-bit flags ($F_1$ and $F_2$) to distinguish speech from FACCH; and 8.25 guard bits (GB) for up/down ramping time. The $F_1$ bit indicates whether the data in the preceding burst was either speech data or FACCH data, and the $F_2$ bit indicates the origin of the data in the current burst.

With Time Division Multiple Access (TDMA), the aforementioned four blocks of 114 bits are assigned to a particular time slot (TS) within a frame FR, e.g., $TS_2$ in FIG. 1. In GSM, each frame FR has eight timeslots ($TS_0$ to $TS_7$) therein, each of which is assigned to a different user. In turn, frame FR is one of 26 frames in a multiframe MF, as is understood in the art.

As discussed, FACCH messaging is implemented by replacing one 20 ms frame of speech data with one FACCH message. Although the number of significant FACCH bits are fewer, i.e., 184 bits, than that of speech data bits, FACCH control signals are encoded more heavily to preserve the integrity of the control message during transmission. After such encoding, the FACCH message is, like speech, 456 bits long. Instead of a traffic channel, however, the FACCH message is sent through a control channel, particularly, as part of the Associated Control Channel. Since both the traffic and control channels are logical channels sharing a common physical channel upon transmission, the control channel supersedes the traffic channel on the common physical channel and speech is lost.

Figure 2:
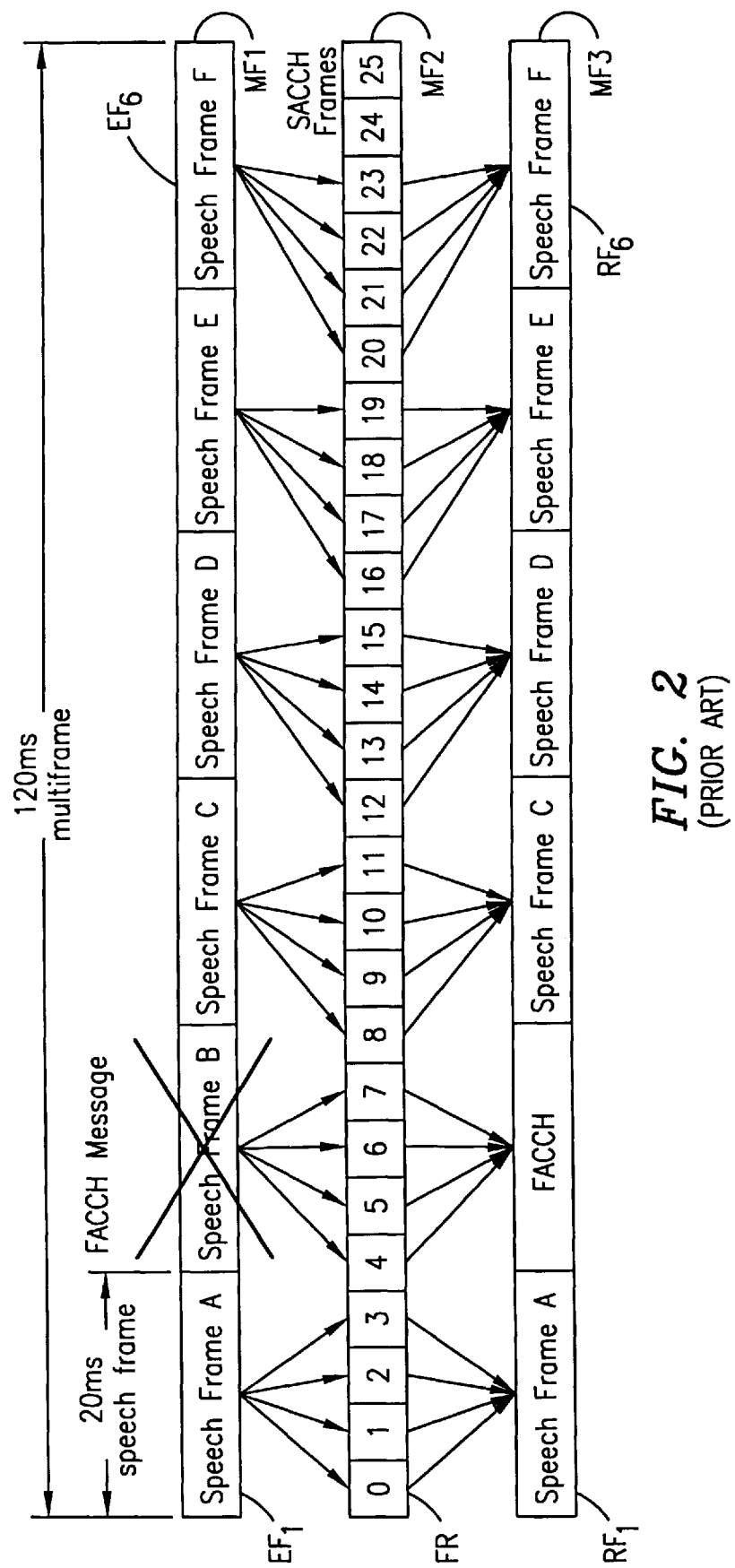
FIG. 2 is a block diagram illustrating the structure of frame transference in encoding, transmitting and decoding speech frames using the frame format as in FIG. 1, and illustrating an overriding control signal preempting speech.

With reference now to FIG. 2, there is illustrated a mapping of speech and control signal frames to TDMA frames for a standard GSM system ("full-rate"). For simplicity, interleaving and delays are not shown in the figure. An encoded multiframe MF1, representing a 120 ms portion of speech, is divided into 6 consecutive encoder frames ($EF_1$ to $EF_6$), one of which, $EF_2$, is overridden by a FACCH message. As discussed, each encoder frame EF, whether speech or FACCH, is mapped to four consecutive frames FR in TDMA multiframe MF2, particularly, within one of the respective timeslots TS therein. For simplicity, the timeslots TS are not shown. The respective consecutively grouped frames FR within multiframe MF2, therefore, as shown in FIG. 2, contain either speech or control signals, which are received, decoded and re-assembled at a receiver.

In GSM, the aforedescribed steal flags $F_1$ and $F_2$ are utilized in determining whether a given received frame ($RF_1$ to $RF_6$) contains speech or FACCH. Since each burst in GSM has these two overhead bits, distinguishing between speech/FACCH in GSM is a straightforward procedure and is termed "robust". Once a four burst, received frame RF has been assembled, a receiver may do a majority vote on the 8 steal flags to determine whether that received frame RF is voice or FACCH. Due to the robust detection mechanism of the steal flags in GSM, it is unlikely that a FACCH frame RF will mistakenly get interpreted as voice and cause speech quality degradation. Another safeguard against such misinterpretation is that a speech frame must pass through a Cyclic Redundancy Check (CRC) before speech decoding.

Although a GSM FACCH message destroys 20 ms of speech, the listener typically cannot recognize such a short interruption, particularly with sophisticated methods such as interpolation of speech frames and insertion of comfort noise at the receiver. Of course, frequent FACCH transmissions or retransmissions of erroneous FACCH messages will perceptibly impact speech quality.

Other standards also employ various means to verify speech data frames. For example, although the Digital Advanced Mobile Phone System (D-AMPS) does not have steal flags such as flags $F_1$ and $F_2$ in GSM, D-AMPS employs separate CRC algorithms for both FACCH and speech data. Typically, a received frame RF will only be passed to the speech decoder if the FACCH CRC fails and the speech CRC passes. Additionally, the bit error rate (BER) estimate from a FACCH Viterbi decode and from the speech Viterbi decode may be used, as is understood in the art.

Also, the Personal Digital Cellular (PDC) standard air interface defines a single "steal flag" in its slot structure. As with GSM, this mechanism is fairly robust. Additionally, as with D-AMPS, a CRC is defined for both speech and FACCH. Audio is, therefore, only played if the steal flag indicates that the current frame is speech, the FACCH CRC failed and the speech CRC passed.

Although similar to GSM in many ways, the ACeS system is designed to operate with much greater capacity. Because of the severe power and possible bandwidth limitations in a satellite communications system, speech must be coded at bit-rates much lower than those in GSM. Accordingly, instead of encoding speech at 13 Kbps, ACeS codes speech at 3.6 Kbps, which is equivalent to 72 bits per 20 ms, which becomes 120 bits in basic mode after channel encoding.

Figure 3:
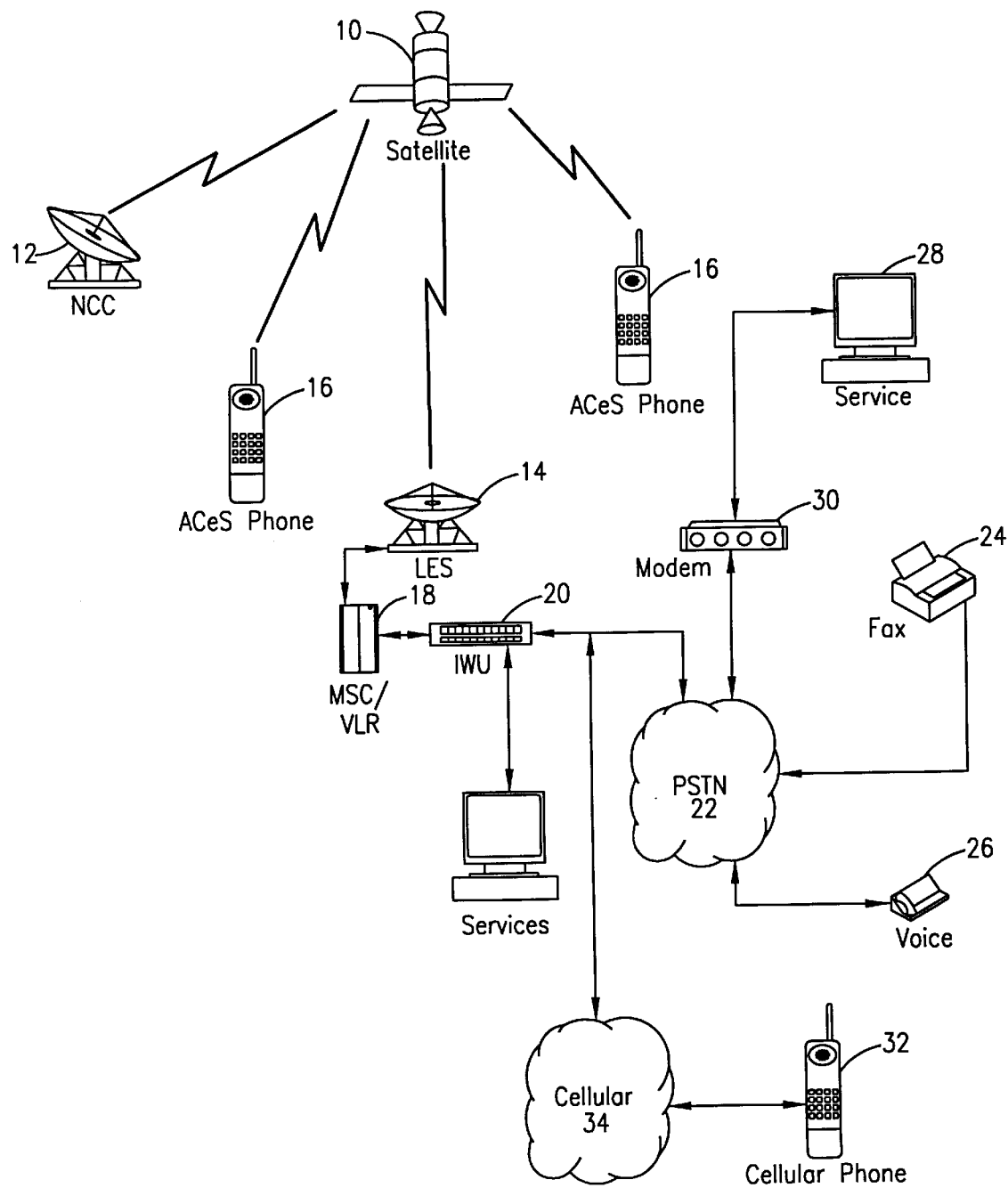
FIG. 3 illustrates a representative diagram of a satellite-cellular communication system which utilizes the improved communications system and method of the present invention.

A representative diagram of a satellite-cellular communication network is shown in FIG. 3. A satellite 10, such as one in geostationary orbit over SouthEast Asia in the ACeS system, forwards and receives digital information to and from a variety of land-based equipment, such as a Network Control Center (NCC) 12 for controlling call management functions, a Land-Earth Station (LES) 14 and a plurality of cellular phones 16. The LES 14, a mobile switching center/visitor location register (MSC/VLR) 18 and an interworking unit 20 handle the traffic channels, as is understood in the art.

Through the interworking unit 20, cellular communications are also accessible through a public Switched Telephone Network (PSTN) 22 to a facsimile 24, a regular non-cellular telephone 26 and a service computer 28 via a modem 30. Other cellular devices, such as other cellular phones 32, may also access the satellite through a cellular link 34.

Figure 4:
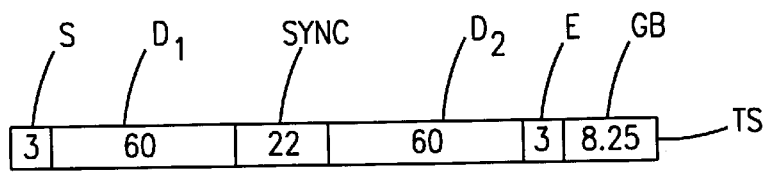
FIG. 4 is a block diagram illustrating the format of a frame timeslot in normal burst mode in ACeS.

The format of an ACeS burst is different from that of a GSM burst, as shown in FIG. 4, and incorporates more data bits therein, i.e., 120 per burst ($D_1$ and $D_2$) as compared to 114 for GSM. The SYNC field has been shortened and the steal flag bits $F_1$ and $F_2$ have been eliminated in order to provide more data bits in the $D_1$ and $D_2$ fields. The SAIS suggests that speech should be processed whenever the speech CRC passes. As discussed, however, some FACCH and other anomalous signals may improperly pass the speech CRC, thereby degrading the speech quality.

In an effort to support more users, ACeS provides for multiple users per time slot, effectively becoming a 32-slot system in basic mode (a GSM "quarter-rate" mode). Thus, instead of 8 simultaneous users in a GSM system, ACeS supports up to 32 users.

Although the number of pertinent speech bits in ACeS is fewer per user, the number of FACCH and Slow Associated Control Channel (SACCH) bits remain at 184 bits per message, as in GSM. Thus, expansion of FACCH to 480 bits (120×4) means that 4 speech frames are required to transmit the FACCH message to each receiver, destroying 80 ms of speech, four times the speech loss in GSM.

Figure 5:
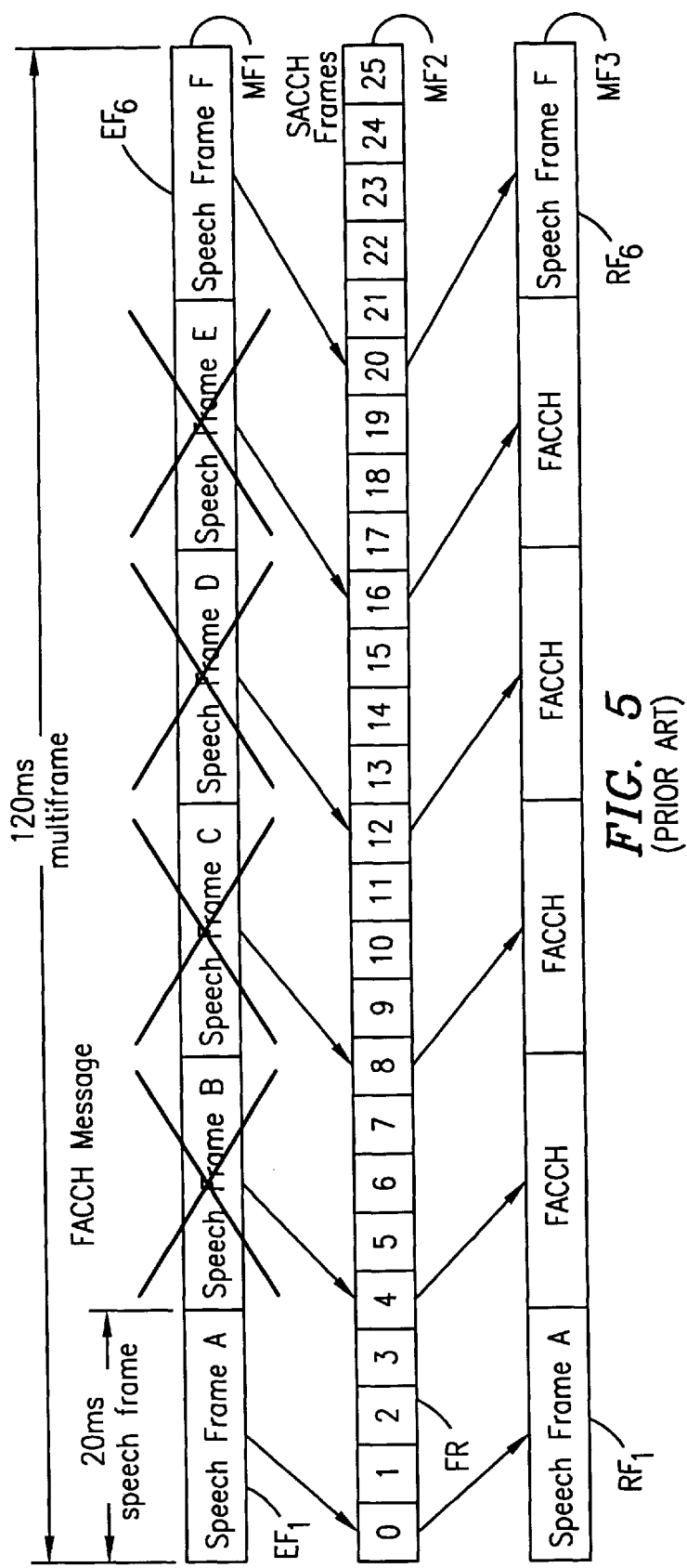
FIG. 5 is a block diagram in accordance with the structure and methodology shown in FIG. 2, and illustrating an overriding control signal preempting speech within an ACeS system.

The particular operation of FACCH transmissions within ACeS is further shown in FIG. 5, which illustrates a mapping of speech frames and FACCH messages to TDMA frames for an ACeS system. As in FIG. 2, interleaving and delays are not shown for simplicity. Encoded multiframe MF1 in FIG. 5 is divided into 6 consecutive encoder frames ($EF_1$ to $EF_6$), four of which $EF_2$ to $EF_5$, now preempt 80 ms of speech.

A complication of the above SAIS ACeS protocol, as compared with GSM, is that since a speech frame in ACeS is represented by one burst (basic mode), while a FACCH transmission still comprises four bursts, it is no longer feasible when processing incoming signals (as with GSM) to take an entire 4-burst block of data and classify it as speech or FACCH. Instead, under the SAIS protocol, the receiver must determine on a burst-by-burst basis whether to play audio.

Further, suppose a FACCH message comes across the traffic channel instead of speech. Each burst would get FEC decoded as if it were speech. Given enough time and signal variations, an occasional FACCH message will create an erroneous speech CRC pass. Considering that the speech CRC constitutes only 6 bits, the probability of a nonspeech signal passing the CRC on a single burst of random data is $1/64$. Furthermore, because multiple paths may be searched looking for a CRC pass, this probability rises above the already statistically significant $1/64$ chance. Accordingly, the probability that one of the FACCH bursts would be mistakenly interpreted as speech becomes quite significant. As discussed, all it takes is a single bad frame played in this manner to create a "pop" or other speech artifact. Thus, it seems that using only the speech CRC to determine when to play audio, such as suggested by the SAIS standard, will result in poor speech quality and loss of customer satisfaction.

Furthermore, the SAIS defines a DTX mode which is very similar to GSM's DTX mode. The speech coder includes a Voice Activity Detector (VAD). Whenever the VAD determines that voice is no longer active, a transmitter may enter DTX mode. When the transmitter enters such a mode, it ceases to transmit in every one of its assigned timeslots. Instead, it transmits at a lower rate (typically about once per second). The frames which are transmitted at this lower rate are different from normal speech frames. These special frames are termed "silence descriptor" (SID) frames. They characterize the acoustic background noise at the transmitter. The receiver may then use the SID frames to emulate any background noise at the transmitter. In the time between SID frame transmissions during a DTX period, the receiver is receiving nothing. Once voice activity resumes at the transmitter, the transmitter will exit the DTX period and begin transmitting normal voice frames again. Thus, the receiver must always be ready for the transmitter to exit the DTX period.

At the receiver, the periodic SID frames are used by the speech decoder to insert "comfort noise." During periods when valid SID frames are not being received, the noise characteristics of the last received SID frame are played. The speech decoder, however, must be ready to begin playing voice again when voice transmission restarts. During DTX periods, the transmitter is generally not transmitting any traffic frames to the receiver for long periods of time. However, the receiver is still demodulating whatever is on the air in anticipation of the resumption of speech. The random or "bad frame" data provided by the demodulator will occasionally (on the order of 1–10% of the time) create a CRC pass. Considering the length of typical DTX periods (on the order of hundreds of frames), it becomes very likely that random data during DTX periods will create a speech CRC pass. As noted, if any of this random data gets played as audio, it is likely to create degrading artifacts within the comfort noise. This bad frame will probably be followed by random data during the DTX period which may be interpreted (correctly) as bad frames. This will force frame repeats, effectively lengthening the period of time the misinterpreted bad frame will be played, causing further user annoyance.

In view of some convolutional coding peculiarities within the SAIS, convolutional coding and an implementation thereof will now be discussed. A convolutional code may be represented by a shift register into which input bits are shifted. For a ½ rate code, each input bit produces 2 output bits. At the end of a transmission, some number of zeros is typically input to zero out the shift register. This puts the shift register into a known state. At the receiving end, the decoder has a priori knowledge that the shift register began in the all zero state and ended in the all zero state. Thus, a Viterbi decoder starts its search in the zero state and ends its search in the zero state.

The SAIS specifies several convolutional codes for use in correcting bit errors. The convolutional code specified for basic mode FACCH is a ½ rate code which must end in the zero state as discussed above. The code specified for (basic mode) voice is also ½ rate, but does not require that the ending state be zero. At the convolutional decoder (Viterbi decoder), this means that the correct path through the trellis does not necessarily end in the zero state. Instead, each of the ending states represent valid traces through the trellis. The traceback with the best metric is the first considered, and if this traceback produces a CRC pass, that traceback is taken as the candidate speech frame. If, however, that traceback produced a CRC failure, the traceback with the second best metric is considered. This process continues for N tracebacks in an attempt to find a CRC pass.

Because the FACCH coding must end in the zero state, the Viterbi metric should indicate (for a FACCH message) that the zero state has a better metric than the other M-1 states. Thus, if the zero state has the best metric at the end of the Viterbi decode, it is deemed likely that the process is in the midst of decoding one of the four frames constituting a FACCH message. Consequently, it is less likely that the frame is voice.

The present invention further differs from the art in not requiring the correct path through the trellis for voice transmissions to end in the zero state, which means that the aforementioned shift register need not be flushed. Accordingly, the ending state may end in any of the possible states, e.g., 64. Each of which are examined to determine the best metric. If the best metric is the zero state, i.e., one of 64 possible states in voice, it is likely that the particular transmission frame is part of a FACCH message and not voice.

Figure 6:
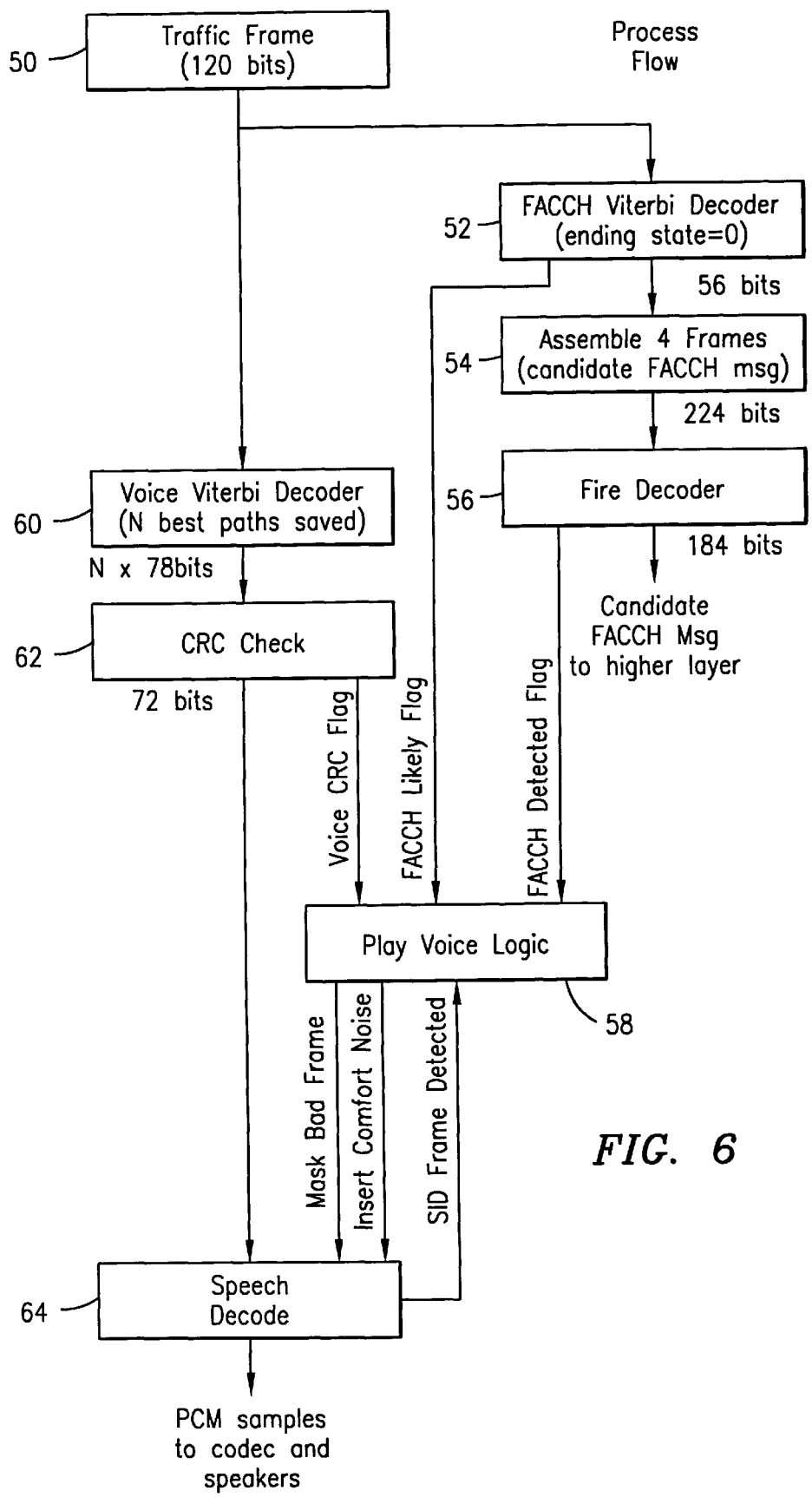
FIG. 6 is a flow chart representation of a process flow diagram illustrating the signal flow of a received burst, such as shown in FIG. 4, within a receiver.

With reference now to FIG. 6, there is shown a process flow diagram illustrating the flow of control within a receiver (within a particular mobile terminal 16 or LES 14) after the incoming signal exits the equalizer/demodulator therein. The frame of data (120 bits) after demodulation is represented in box 50. This data is fed both to a FACCH Viterbi decoder 52 and a voice Viterbi decoder 60. Within decoder 52, the 120 bits are Viterbi decoded to an output 56 bits and the trellis is forced to terminate in the zero state. (The traceback is always from the zero state.) If the zero state happened to have the best metric of all the ending states, a FACCH likely flag, discussed further herein, is set. The 56 bit frame is then passed to an assembler 54 which assembles the received frame of data with the three prior frames, the four of which are then sent to a fire decoder 56, which accepts a 224 (56×4) bit segment of data and outputs 184 bits after fire decoding. If the fire decoder 56 determines that a valid four frame FACCH message was received, a FACCH detected flag is set and passed to a play voice logic device 58, as also discussed further herein. The properly received and decoded FACCH message is then passed along to the appropriate higher layer for processing.

As within the FACCH Viterbi decoder 52, the voice Viterbi decoder 60 accepts the 120-bit traffic frame but outputs N candidate 78-bit frames. These N candidate frames are found by choosing the N ending states in the Viterbi trellis which have the best metrics. The N candidate frames are then forwarded to a CRC check 62 which attempts to find the best frame among the N candidate frames which has a passing CRC. If successful in finding such a frame, the check 62 sets a voice CRC flag, which is forwarded to the play voice logic device 58, and forwards 72 bits of speech data (6 bits were used in the CRC checking) to a speech decoder 64.

Figures 7, 8:
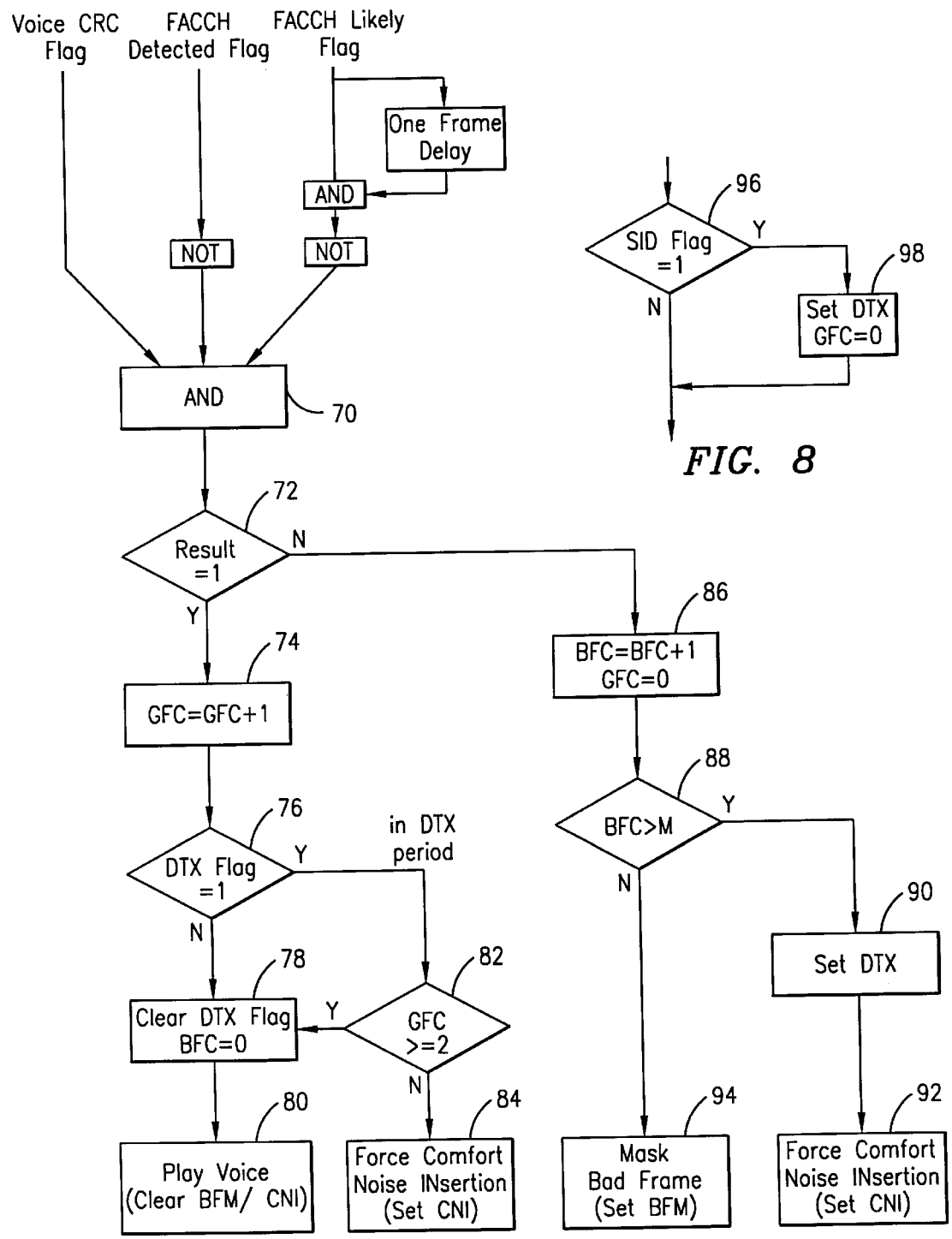
FIG. 7 is a flow chart representation of steps followed in a play voice logic device shown in FIG. 6.
FIG. 8 is another flow chart representation of additional steps followed in the play voice logic device of FIG. 6.

With reference now to FIG. 7, there is illustrated some of the methodology of the play voice logic device 58, which implements many of the features of the present invention. As noted in FIG. 6, the results of the three flags, i.e., the voice CRC flag from the CRC check 62, the FACCH detected flag from the fire decoder 56 (actually the inverted value thereof) and the FACCH likely flag from the FACCH Viterbi decoder 52 (actually the inverted value of the logical addition of the current and previous frames) are fed into an AND logical summation function (box 70).

If the summation result (box 72) of the aforementioned inputs is one (TRUE), then control is passed to box 74, indicating that the particular incoming frame of data is most likely speech; otherwise control is passed to box 86. At box 74, a good frame counter (GFC), where "good" means speech, is incremented and control is passed to box 76 where the value of a DTX flag is assessed. If the DTX flag is set, indicating that the transmitter is in a DTX period, then control is passed to box 82, discussed further below; otherwise, control is passed to box 78. As noted hereinbefore, during DTX, the receiver must continually search for valid frames in anticipation of the conclusion of the DTX period. When in the box 78 branch, however, it is assumed that the transmission is not in a DTX period. Accordingly, the DTX flag is cleared and a bad frame counter is reset. At this juncture, all system indications, i.e., the aforementioned flags and counters, suggest that the incoming frame of data is indeed speech data, which is, accordingly, played (box 80). The playing of a speech frame is accomplished by clearing a bad frame mask (BFM) flag and a comfort noise insertion (CNI flag), as is understood in the art.

Where, however, the DTX flag is set (box 76), a determination (box 82) is made whether the aforedescribed good frame counter is equal to or greater than two. It should, of course, be understood that other GFC thresholds may be utilized in other embodiments. The reason for this check (box 82) is to determine if transmission has resumed. Speech will resume after two consecutive valid speech frames have been received. Since the odds of two consecutive random noise frames passing for two good frames is statistically very low, this mechanism substantially reduces the probability that random noise frames will be played as speech. If two or more consecutive speech frames have been received, as indicated by the good frame counter value (box 82), then control is transferred to the aforedescribed box 78 and processed accordingly; otherwise, the process forces comfort noise insertion (CNI) (box 84).

With reference again to FIG. 7, if the aforedescribed four flag summation (box 72) is not one (FALSE), indicating a non-speech frame, then control is passed to box 86 where a bad frame counter (BFC) is incremented and the aforementioned GFC is reset. Control is then passed to box 88 where a determination is made whether the number of bad frames encountered is greater than a limit M. In the presently preferred embodiments of the present invention M is 4. If the BFC is greater than the limit M, indicating that a good speech frame has not been received for a lengthy period of time, then control transfers to box 90, where it is assumed that the transmitter has entered a DTX period. Accordingly, as in box 84, the receiver forces CNI (box 92). If fewer bad frames have been encountered recently, i.e., the BFC is less than M (box 88), then the receiver masks (box 94) the incoming non-speech bad frame, e.g., by repeating the previous speech frame. However, it is assumed here that the bad frames are due to a brief impairment on the channel rather than the transmitter having entered a DTX period.

Through use of the play voice logic device 58, shown in FIG. 6, with the aforedescribed logic flow therein, as shown in FIG. 7, most of the previously discussed anomalous situations causing speech quality degradation are handled. For example, the logic shown in FIG. 6 makes it unlikely that FACCH bursts will be mistakenly interpreted as speech and played out of the speech decoder, resulting in the aforementioned audio pops. With reference to FIG. 5, if an incoming burst represents the fourth (and last) burst of a FACCH message, the fire decoder 56 should set the FACCH detected flag, forcing the speech decoder 64 to take corrective action, e.g., the speech decoder 64 upon receipt of a bad frame mask flag controls whether to frame repeat or insert comfort noise. Typically, the speech decoder 64 repeats up to four frames in a row, i.e., M=4, and then starts comfort noise insertion.

Regarding the more problematic previous three FACCH bursts, the methodology of the present invention assists in this determination also. If the FACCH Viterbi decoder 52 determines that two consecutive bursts have zero ending states which represent/contain the best metrics of all the ending states, it is likely that the particular incoming frame or burst is part of a FACCH message transmission. Here, the speech decoder must also take corrective action, as described, to mask these "bad" frames. Lastly, with only the more problematic first FACCH message burst which is still in doubt, and as a final precaution, the voice CRC check 62 for the incoming frame must pass before that frame is passed through the speech decoder 64. As before, if the voice CRC fails, the speech decoder 64 will be forced to take the aforedescribed corrective actions.

Also, through use of the play voice logic device 58 and associated circuitry therein, shown in FIGS. 6 and 7, anomalous situations arising out of DTX mode usage are addressed as well. For example, at the onset of a DTX period, the speech encoder at the transmitting end begins creating Silence Descriptor (SID) frames which may be used by the speech decoder 64 to determine the correct noise characteristics for CNI. The transmitter sends a limited number of these SID frames before the onset of the DTX period. Whenever the speech decoder 64 receives a SID frame, it begins CNI and sets a SID frame detected flag, which is available after the speech decoder 64 has run. As shown in FIG. 6, another input into the play voice logic device 58 is the SID frame detected flag from the speech decoder 64.

Additional circuitry within the play voice logic device 58 for SID frame detection is illustrated in FIG. 8. The play voice logic device 58, upon receipt of the SID frame detected flag from the speech decoder 64, will set the aforementioned DTX flag, indicating the transmitter is operating in DTX mode, if the last received frame was a SID frame, as indicated by the Boolean value of the SID frame detected flag (box 96). If the value is one (TRUE), then DTX mode is in operation and the GFC is reset or initialized to zero FIG. 5 (box 98), at which point control is transferred to the operations shown in FIG. 7, particularly, beginning at box 70 therein. If the value is not one (FALSE) in box 96, then control also transfers to box 70.

During the DTX period, SID frames are periodically transmitted so that the comfort noise characteristics at the receiver may stay in sync with the noise characteristics at the transmitter. These SID frames should pass through to the speech decoder 64. The problem occurs with the onset of voice which may occur at any time. Because the onset of voice is not deterministic, the receiver must always search for valid voice frames. There is a significant probability that the random data being received may cause a voice CRC pass, as described hereinbefore. The logic shown in FIG. 6, however, prevents the speech decoder 64 from playing a received frame for a single good received frame.

At the end of the DTX period, voice frames will again be transmitted over the air. The use of the good frame counter with the logic device 58 in FIG. 6 requires that two valid voice frames be received consecutively before the audio path is opened. This requirement makes it unlikely that random noise during the DTX period will be misdetected as voice and played. The requirement does mean, however, that the first voice frame at the onset of voice will get muted. Nonetheless, because voice activity detectors usually employ some type of look-ahead, the muting of this first frame is not noticeable.

It should be understood that in an alternative embodiment of the present invention the summation box 70 in FIG. 7 may be implemented in alternative manners, e.g., making the logic therein a more general equation which takes numerous inputs and has a threshold to determine whether to take a good frame or bad frame path.

In another alternative embodiment of the present invention, a four frame block, e.g., $EF_2$ to $EF_5$ in FIG. 5, could be fire decoded to determine if it was a FACCH message. If not, the oldest frame would then be speech decoded if the CRC passed. This embodiment, however, is not preferred because of the additional 60 ms of delay introduced.

It should be understood that although the aforedescribed preferred embodiment employs TDMA technology, the principles of the present invention are applicable to other access techniques, e.g., Code Division Multiple Access (CDMA) technology, TDMA/CDMA hybrids and any other digital telecommunications system employing speech frames.

While the invention has been described in connection with preferred embodiments thereof, it is to be understood that the scope of the invention is not limited to the described embodiments, but is intended to encompass various modifications and equivalents within the spirit and scope of the appended claims.

What is claimed is:

1. A receiver apparatus in a digital telecommunication system, said receiver receiving a substantially continuous series of transmission frames containing therein speech transmission and respective frames within said series containing a plurality of control signal transmissions therein, said receiver apparatus comprising:

a detector for detecting said series of transmission frames, said detector setting a multiplicity of flags therein for a particular transmission frame, said flags comprising a speech flag set if said particular transmission frame contains speech therein, a control signal detected flag set if said particular transmission frame contains said control signal transmissions therein and a control signal likely flag if said particular transmission frame potentially contains said control signal transmissions therein; and a summation device, attached to said detector, said detector applying said multiplicity of flags to said summation device, whereby said speech transmissions play at said receiver whenever said summation device indicates a speech transmission.

2. The receiver apparatus according to claim 1, further comprising:
   a first voice transmission decoder, said first voice decoder receiving said particular transmission frame and setting said speech flag if said particular transmission frame decodes pursuant to a first metric.

3. The receiver apparatus according to claim 2, wherein said first voice transmission decoder is a Viterbi decoder, said Viterbi decoder forming a multiplicity of candidate frames pursuant to said first metric.

4. The receiver apparatus according to claim 3, wherein if the best candidate frame metric of said multiplicity of candidate frames is a zero state, said control signal likely flag is set.

5. The receiver apparatus according to claim 2, further comprising:
   a second voice transmission decoder, said second voice decoder receiving said decoded particular transmission frame from said first voice decoder, said particular transmission frame being decoded by said first voice decoder, and said second voice decoder setting said speech flag if said decoded particular transmission frame decodes pursuant to a second metric.

6. The receiver apparatus according to claim 5, where said second voice transmission decoder is a cyclic redundancy code check, said speech flag set if said decoded particular transmission frame passes said cyclic redundancy code check.

7. The receiver apparatus according to claim 1, wherein said detector further comprises:
   a control signal transmission decoder, said control signal transmission decoder receiving said particular transmission frame and setting said control signal likely flag if said particular transmission frame decodes pursuant to a third metric forming a candidate control signal frame.

8. The receiver apparatus according to claim 7, wherein said control signal transmission decoder is a Viterbi decoder, said control signal likely flag being set if said particular transmission frame decodes pursuant to said Viterbi decoder.

9. The receiver apparatus according to claim 7, further comprising:
   a fire decoder, said fire decoder receiving said candidate control signal frame and a plurality of prior transmission frames, from said control signal transmission decoder, and setting said control signal detected flag if said fire decoder determines that a valid control signal transmission was received.

10. The receiver apparatus according to claim 9, further comprising an assembler, said assembler receiving said candidate control signal frame, assembling said candidate control signal frame with said plurality of prior transmission frames, forming an assembled frame group, and forwarding said assembled frame group to said fire decoder.

11. The receiver apparatus according to claim 10, wherein said assembler assembles four said frames, one being said candidate control signal frame and the remaining three being said prior transmission frames.

12. The receiver apparatus according to claim 1, wherein said multiplicity of flags received by said summation device comprise said speech flag, an inverted control signal detected flag, and an inverted control signal likely flag, the summation of said multiplicity of flags being set if said particular transmission frame is a speech transmission.

13. The receiver apparatus according to claim 12, wherein said inverted control signal likely flag comprises the inverted value of the addition of the control signal likely flags for the particular transmission frame and a plurality of previous transmission frames.

14. The receiver apparatus according to claim 1, further comprising a discontinuous transmission (DTX) mode flag, said DTX mode flag when set indicating insertion of comfort noise in said series of transmission frames for playing at said receiver, said DTX mode flag when not set indicating playing said speech transmissions at said receiver.

15. The receiver apparatus according to claim 14, wherein when said DTX mode is set and a multiplicity of speech transmission frames are received, said speech transmissions are played at said receiver.

16. The receiver apparatus according to claim 14, further comprising a speech decoder, said speech decoder decoding said speech transmissions if said speech flag is set.

17. The receiver apparatus according to claim 16, wherein said speech decoder sets said DTX mode flag when said series of transmission frames enters a DTX period, and wherein, at the end of said DTX period, said detector detects at least two consecutive speech transmission frames prior to playing said speech transmissions.

18. The receiver apparatus according to claim 1, wherein said control signal transmissions are Fast Associated Control Channel (FACCH) signals within said series of transmission frames.

19. The receiver apparatus according to claim 18, wherein said FACCH signals comprise four consecutive transmission frames in said series.

20. The receiver apparatus according to claim 1, wherein said telecommunications system is based upon Satellite Air Interface Specification protocols.

21. The receiver apparatus according to claim 1, wherein said receiver is within a mobile terminal in wireless communication with a base station.

22. The receiver apparatus according to claim 1, wherein said receiver is within a base station.

23. In a digital telecommunications system having a first communication system and a second communication system, the first and second communication systems coupled together by way of a communication channel, a combination with the first and second communication systems of communication circuitry for transmitting and receiving, respectively, a plurality of speech frames therebetween, said circuitry comprising:
   transmission means within said first communication system, said transmission means generating and transmitting a substantially continuous series of transmission frames containing said speech frame segments therein across said communication channel, said transmission means also generating and transmitting a plurality of transmission frames of a control signal across said communication channel, said control signal having precedence over said speech and a plurality of control signal frames overriding a corresponding plurality of said speech frames;
   reception means within said second communication system, said reception means for receiving said substantially continuous sequence of transmission frames containing therein said speech frames and said control frames across said communication channel; and
   detection means within said second communication system, said detection means for detecting said speech and said control signals within a segment of said continuous series of received transmission frames, said detection means identifying speech within a particular transmission frame of said segment by applying a multiplicity of flags to a summation device, said flags comprising a speech flag set if said detection means identifies said particular transmission frame as containing speech, a control signal detected flag set if said detection means identifies said particular transmission frame as containing control signals, and a control signal likely flag set if said detection means identifies said particular transmission frame as potentially containing control signals.

24. The communication circuitry according to claim 23, wherein said first communication system is a base station and said second communication system is a mobile terminal in wireless communication with said base station across said communication channel.

25. The communication circuitry according to claim 23, wherein said second communication system is a base station.

26. The communication circuitry according to claim 23, wherein said control signal is a Fast Associated Control Channel signal.

27. The communication circuitry according to claim 23, wherein said telecommunications system is based upon Satellite Air Interface Specification protocols.

28. The communication circuitry according to claim 23, wherein said control signal likely flag is set if said detection means determines that a best candidate frame metric for said particular transmission frame pursuant to a first metric is a zero state.

29. A digital telecommunications system having a transmitter and a receiver coupled together by way of a communication channel, a substantially continuous series of transmission frames containing speech and a plurality of control signals therein passing across said channel from said transmitter to said receiver across such channel, said control signal having precedence over and overriding said speech, said telecommunications system comprising:
  a detector, attached to said receiver, for detecting said series of transmission frames, said detector setting a multiplicity of flags, said flags comprising a speech flag set if a particular transmission frame contains speech therein, a control signal detected flag if said particular transmission frame contains said control signals therein and a control signal likely flag if said particular transmission frame potentially contains said control signals therein; and
  a summation device, attached to said detector, said detector applying said multiplicity of flags to said summation device, whereby speech transmissions play at said receiver whenever said summation device indicates a speech transmission.

30. The telecommunications system according to claim 29, wherein said receiver, detector and summation device are within a mobile terminal in wireless communication with said transmitter.

31. The telecommunications system according to claim 29, wherein said receiver, detector and summation device are within a base station.

32. The telecommunications system according to claim 29, wherein said control signal is a Fast Associated Control Channel signal.

33. The telecommunications system according to claim 29, wherein said telecommunications system is based upon Satellite Air Interface Specification protocols.

34. The telecommunications system according to claim 29, wherein said control signal likely flag is set if said detection means determines that a best candidate frame metric for said particular transmission frame pursuant to a first metric is a zero state.

35. A method for forwarding a transmission from a first communication system to a second communication system and playing said transmission at said second communication system, said method comprising the following steps:
  transmitting, from a transmitter within said first communication system to a receiver within said second communication system, a substantially continuous series of transmission frames across a communication channel therebetween, said series of transmission frames containing therein speech transmission frames and respective frames within said series containing a plurality of control signal transmissions;
  setting, within said receiver, a multiplicity of flags, said flags comprising a speech flag set if a particular transmission frame contains speech, a control signal detected flag set if said particular transmission frame contains said control signal transmissions, and a control signal likely flag set if said receiver determines that said particular transmission frame potentially contains said control signal transmissions; and
  applying said multiplicity of flags to a summation device within said receiver, whereby said speech transmission plays at said second communication system whenever said summation device indicates a speech transmission.

36. The method according to claim 35, wherein said first communication system is a base station and said second communication system is a mobile terminal in wireless communication with said base station across said communication channel.

37. The method according to claim 35, wherein said second communication system is a base station.

38. The method according to claim 35, wherein said control signal is a Fast Associated Control Channel signal.

39. The method according to claim 35, wherein said telecommunications system is based upon Satellite Air Interface Specification protocols.

40. The method according to claim 35, further comprising steps of:
  calculating a best candidate frame metric for said particular transmission frame pursuant to a first metric;
  determining if said best candidate frame metric is a zero state; and
  setting said control likely flag if said best candidate from metric is said zero state.

* * * * *